United States Patent [19]
Liu

[11] Patent Number: 5,864,548
[45] Date of Patent: Jan. 26, 1999

[54] METHOD AND APPARATUS FOR FAST MODULATION IN SYNCHRONOUS CDMA COMMUNICATIONS

[75] Inventor: Hui Liu, Austin, Tex.

[73] Assignee: Cwill Telecommunications, Inc., Austin, Tex.

[21] Appl. No.: 779,263

[22] Filed: Jan. 6, 1997

[51] Int. Cl.[6] .................................................. H04B 7/216
[52] U.S. Cl. .......................... 370/320; 375/200; 375/206
[58] Field of Search .................................. 370/208, 209, 370/210, 320, 335, 342, 441, 515; 375/200, 201, 206, 267, 207, 208; 332/119, 128

[56] References Cited

U.S. PATENT DOCUMENTS 5,463,657 10/1995 Rice ......................................... 375/200

OTHER PUBLICATIONS

Proaki, J., *Digital Communications*, Third Edition, McGraw–Hill, Inc., pp. 422.

*Primary Examiner*—Chi H. Pham
*Assistant Examiner*—Afsar Qureshi
*Attorney, Agent, or Firm*—Jeffrey C. Hood

[57] ABSTRACT

A system and method for modulating synchronous CDMA (S-CDMA) signals in antenna array wireless system. By taking advantage of the symmetric property of Walsh code words utilized in S-CDMA perform modulation of signals intended for a plurality of users. The system includes a Fast Hadamard Transform (FHT) Processor that realizes baseband operations including spreading and digital combining in one step. In addition to significant reduction in computations and storage over prior methods, the invention also provides substantial advantages in hardware implementation. While the exemplary embodiment is described in the context of antenna array CDMA systems, the disclosed techniques have general applications in CDMA systems with arbitrary symbol values.

12 Claims, 3 Drawing Sheets

METHOD AND APPARATUS FOR FAST MODULATION IN SYNCHRONOUS CDMA COMMUNICATIONS

BACKGROUND OF THE INVENTION

The present invention relates to code-division-multiple-access (CDMA) communications, and more particularly to a method for fast modulation using the Fast Hadamard Transform in a synchronous CDMA antenna array wireless system.

In PCS and other wireless communication systems, a central base station communicates with a plurality of remote terminals. Frequency-division multiple access (FDMA) and Time-division multiple access (TDMA) are the traditional multiple access schemes to provide simultaneous services to a number of terminals. The basic idea behind FDMA and TDMA techniques is to slice the available resource into multiple frequency or time slots, respectively, so that multiple terminals can be accommodated without causing interference.

Contrasting these schemes which separate signals in frequency or time domains, Code-division multiple access (CDMA) allows multiple users to share a common frequency and time channel by using coded modulation. In addition to bandwidth efficiency and interference immunity, CDMA has shown real promise in wireless applications for its adaptability to dynamic traffic patterns in a mobile environment. Because of these intrinsic advantages, CDMA is seen as the generic next-generation signal access strategy for wireless communications.

In CDMA communications, the message information is modulated by a pseudo noise (PN) sequence or spreading code. Synchronous CDMA (S-CDMA) communications systems provide for synchronous transmission and reception by all users. S-CDMA thus allows the use of orthogonal code words which possess inherent mutual interference resistance. In contrast, asynchronous CDMA systems do not provide for synchronous transmission and thus cannot use orthogonal code words. Thus S-CDMA systems offer high capacity relative to asynchronous CDMA systems with the same spreading gain. An ideal application of S-CDMA scheme is one-point to multi-point (point-to-multipoint) communications, e.g., from a base station to a plurality of remote terminals, where signals transmitted to different terminals are perfectly synchronized.

When an antenna array is employed at the base station, spatial diversity of a wireless system can be exploited to enhance system performance. Among the advantages inherent to an antenna array S-CDMA system are large capacity and range, strong resistance against multipath fading and interference, superior traffic adaptability, and highly flexible hand-off capabilities. There have been a significant number of patents in the area of antenna array applications for wireless communications including V. Graziano, "Antenna Array for a Cellular RF Communications System," U.S. Pat. No. 4,128,740, 13/1977.

In addition to the spreading and combining processes well-known in the current art of CDMA, modulation in an antenna array CDMA system also involves transmission beamforming. Transmission beamforming involves determining the transfer function of the transmission path of a respective terminal, referred to as a spatial signature estimate. The spatial signature estimate is then used to determine transmission beamforming coefficients that are used for transmission to the terminal. The transmission beamforming coefficients represent different weighting values corresponding to each of the antennas in the antenna array. Each transmission beamforming coefficient is multiplied with a user's modulated PN sequence, and the respective results are provided to the respective antennas in the array.

In summary, modulation in an antenna array CDMA system can be achieved by (i) spreading individual message symbols into chip sequences with pre-assigned orthogonal code words (the Walsh Codes); (ii) weighting (beamforming) each chip sequence with a transmission beamforming vector to produce a multichannel chip sequence; and (iii) mixing all multichannel chip sequences to generate transmission multichannel chip sequences for pulse shaping and RF upconversion. The order of (i) and (ii) may be switched without affecting the final results.

Demodulation in a smart antenna CDMA system can be realized using the computationally efficient Fast Hadamard Transform (FHT). In contrast to demodulation, modulation in S-CDMA, especially antenna array S-CDMA, is a more involved process. The spreading and mixing, all at the chip level, are particularly computationally demanding. Please refer to E. Zehavi, "Method and Apparatus for Bifurcating Signal Transmission over In-phase and Quadrature Phase Spread Spectrum Communication Channels", U.S. Pat. No. 5,414,728, 5/1995, for more details on chip-level S-CDMA modulation. The modulation process is further complicated because of beamforming, which allows each beamformed chip signal to take an arbitrary value instead of from a finite alphabet.

A system for cell-site CDMA modulation is disclosed in U.S. Pat. No. 5,300,474, entitled "System and Method for Generating Signal Waveforms in a CDMA Cellular Telephone System". The techniques disclosed therein utilize multiple modulators and D/A converters, each corresponding to one user, and an analog combiner to realize baseband modulation. While this implementation alleviates the computational load of the digital portion of the system, this method introduces undue hardware and clearly increases the system cost and complexity. In a standard software radio design where even dedicated tasks are exported to the digital processor section, it is desirable to perform the modulation using general DSPs rather than customized baseband processors. However, the large volume of data involved due to multiuser, multichannel spreading imposes an extreme challenge to DSP implementation.

An effective way to reduce the required computations in modulation is by using look-up tables (LUTs), i.e., constructing a table whose elements are the ready-to-transmit signals corresponding to all possible symbol combinations. The idea is to centralize the computational load using dedicated DSPs within a certain period so that during actual transmission, signal modulation is reduced to fetching pre-calculated values from the LUT storage. This straightforward approach to reducing complexity requires, however, an extremely large amount of storage in present applications, and a correspondingly large computation time in the construction of the look-up tables.

In addition, as mentioned above, in a smart antenna system the modulation process is further complicated because of beamforming, which allows each beamformed chip signal to take an arbitrary value instead of from a finite alphabet. In other words, the beamforming vector values can take on any value, and thus the beamformed or weighted chip sequences can also take on any value. Since the resultant beamformed or weighted chip sequences can take on any value, look-up tables cannot be used for modulation in a smart antenna system.

Therefore, prior art systems which perform the aforementioned modulation tasks generally introduce undesirable hardware or computational complexity. It is therefore an object of the present invention to provide a system and method for fast modulation of CDMA signals in an antenna array system.

SUMMARY OF THE INVENTION

The present invention discloses a spread-spectrum modulator for modulating P beamformed symbols (symbols with arbitrary values in general) with Walsh orthogonal codes of order L (L is a power-of-2 integer, and $L \geq P$) to generate L chip signals within a symbol period in S-CDMA communications. Briefly, in accordance with the present invention, complete modulation including spreading and combining is implemented in one step, utilizing the Fast Hadamard Transform. In particular, a Fast Hadamard Transform Processor is employed for generating L output chip signals by performing a Fast Hadamard Transform on L input signals, which is comprised of P beamformed symbols and L–P zeros. The L chip signals to be transmitted are readily available as the L output chip signals from the Fast Hadamard Transform Processor.

While it is well-known in the art that the Fast Hadamard Transform can be utilized for demodulating S-CDMA signals, fast modulation, and especially modulation of antenna array CDMA signals with arbitrary values, is traditionally considered to be infeasible. One aspect of the present invention addresses the complexity problem in modulation by introducing a fast implementation mechanism using the FHT. Another aspect of the invention reduces the hardware requirements which enables modulation to be accomplished without specially designed hardware.

The benefits of the present invention may be summarized as follows:
1. High Efficiency: In an M-element antenna array CDMA system with the spreading factor L, the present invention accomplishes baseband modulation including spreading, beamforming and digital combining, for all terminals, with approximately MLlogL computations. Compared to the regular approach which requires $ML^2$ computations (FIG. 1), the total computational cost is magnitudely reduced.
2. Simple Implementation: Without a fast modulation scheme, parallel processing is general required to realize the modulation by dividing the tasks among DSPs. In the present invention, modulation for all symbols is performed simultaneously, thereby allowing a centralized DSP to realize the dedicated task with minimal data communications.
3. No storage requirements: In digital modulation, a look-up-table is often utilized to increase efficiency by pre-calculating modulated signals for all possible symbol combinations. The trade-off is that sufficient time and memory must be allocated to construct and store the table, which may become exceedingly difficult as the table size increases. The fast modulation scheme of the present invention enables on-line realizations which eliminates the requirement of a large memory and a dedicated construction time slot. The present invention is also optimal for antenna array systems, where LUTs cannot be used.

The features, objects, and advantages of the present invention will become more apparent from detailed description set forth below when taken in conjunction with the drawings.

BRIEF DESCRIPTION OF THE DRAWINGS

The accompanying drawings, which are incorporated in and constitute a part of this specification, illustrate particular embodiments of the invention, and together with the description, serve to explain the principles of the invention.

DETAILED DESCRIPTION OF THE PREFERRED EMBODIMENT

Incorporation by Reference

Figure 1:
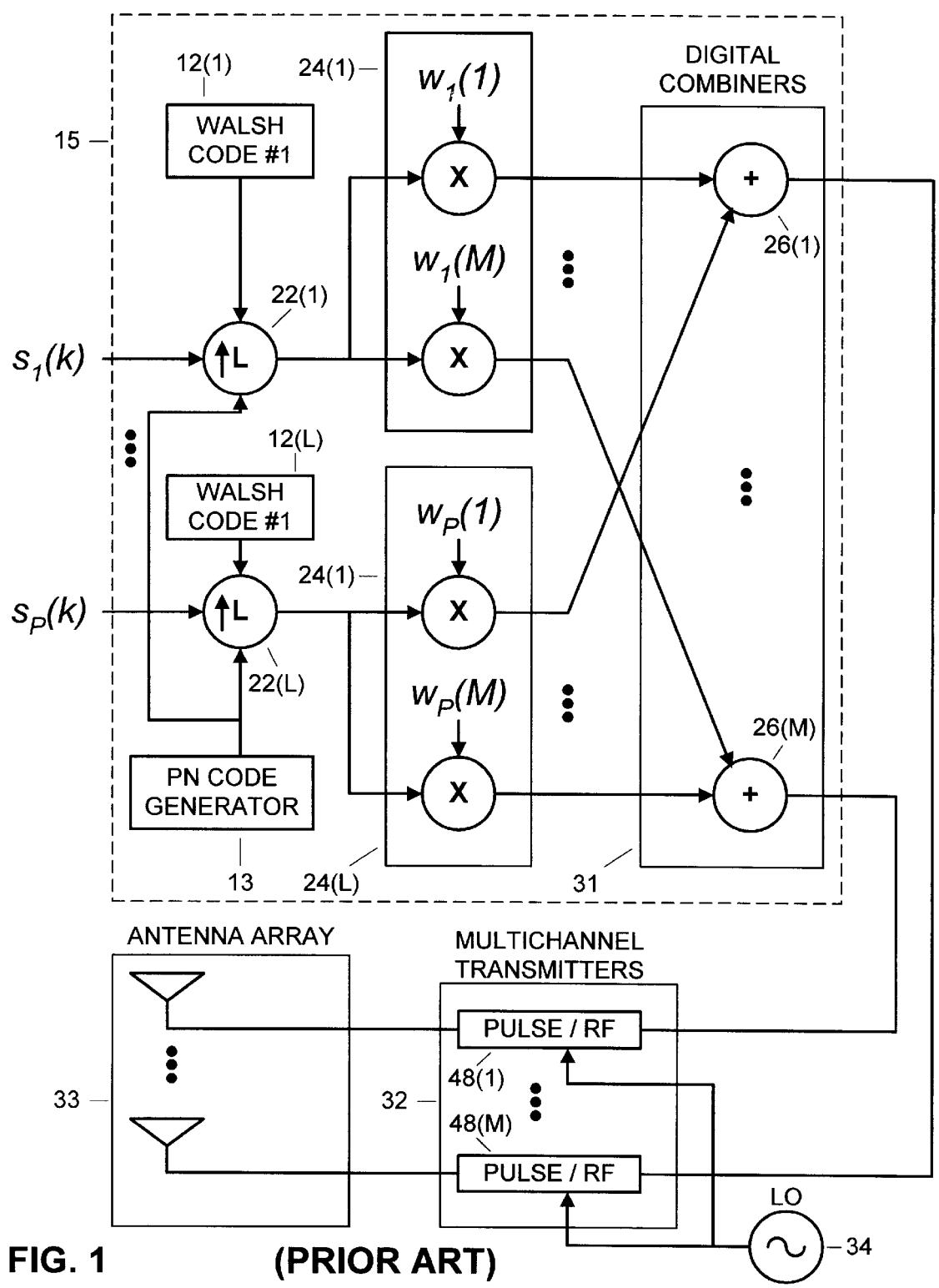
FIG. 1. illustrates a prior art modulation scheme in an antenna array S-CDMA system.

The following U.S. Patent documents and references are hereby incorporated by reference in their entirety as though fully and completely set forth herein.
U.S. Pat. No. 4,128,740, 13/1977 to V. Graziano
U.S. Pat. No. 5,375,140 12/1994 to Bustamante et al.
U.S. Pat. No. 5,414,728 5/1995 to Zehavi
U.S. Pat. No. 5,420,896 5/1995 to Schilling
Digital Communications with Space Applications, S. W. Golomb et al., Prentice-Hall, Inc.
Fundamentals of Digital Image Processing, Anil K. Jain, Prentice-Hall, Inc, 1989
FIG. 1—Prior Art Antenna Array CDMA Modulation Scheme The present invention is directed to a system and method for modulation of S-CDMA signals, preferably in an antenna array wireless system. The problem can be visualized with reference to FIG. 1 in which a prior art modulation scheme is depicted. FIG. 1 illustrates a prior modulation scheme in an antenna array CDMA system. For illustration, the spreading factor is presumed to be L, which equals the maximum number of terminals allowed, and there are a total of M antennas in the system. The symbol sequence to be spread with the ith Walsh code is denoted as $s_i(k)$.

The prior art system shown in FIG. 1 includes a modulator 15 which couples through a multichannel transmitter 32 to an antenna array 33. The modulator 15 includes L Walsh code sources 12(1)–12(L). Each of the L Walsh code sources 12(1)–12(L) includes a unique Walsh code of order L for a respective user or terminal.

The L Walsh code sources 12(1)–12(L) are coupled to Spreaders 22(1)–22(L). At least a subset of the spreaders 22(1)–22(L) receive an input signal $s_i(k)$. The number of signals input to the modulator 15 is designated as P, where $L \geq P$. The number of signals P input to the modulator 15 corresponds to the number P of terminals. Each of the L Walsh code sources 12(1)–12(L) outputs a unique Walsh code to a respective Spreader 22(1)–22(L) in order to spread the message symbols ($s_1$ to $s_P$) into chip sequences. The output chip sequences from the spreaders may be further masked with a pseudo-noise (PN) sequence provided by a PN generator 13 to provide extra security. The spreading and masking are accomplished in one step in this example. The number of operations required in this step is on the order of L×L every symbol period.

The modulator 15 includes P beamformers 24(1)–24(P) coupled to the outputs of the spreaders 22(1)–22(L). Each of the beamformers 24(1)–24(P) includes M multipliers as shown. The beamformers 24 are preferably allocated for each active user, and thus P beamformers are allocated for each of the P users. Upon completion of spreading and masking, beamformers 24(1)–24(P) operate to multiply a respective transmission beamforming vector with each chip sequence output from the spreaders 22(1)–22(L). Thus each chip sequence is beamformed into a multichannel chip sequence using a pre-determined transmission beamform vector ($w_1=[w_1(1) \ldots w_1(M)], \ldots, w_P=[w_P(1) \ldots w_P(M)]$).

The resulting multichannel chip sequences for all symbol sequences are then provided to digital combiner logic 31 comprising a set of digital combiners 26(1)–26(M). Each digital combiner 26(1)–26(M) is associated with a respective antenna 1–M, and each digital combiner 26(1)–26(M) operates to combine the beamformed chip sequences for a respective antenna.

Mathematically, the combined chip sequence within the kth symbol period corresponding to the mth antenna can be represented as $$x_k^m(l) = \sum_{i=1}^{P} w_i(i)s_i(k)c_i(l) \quad l = 1, \ldots L$$

where $s_i(k)$ denotes the kth symbol to be spread with the ith Walsh code, $c_i(l)$ $l=1, \ldots, L$ are the spreading code (ith Walsh code×PN code) unique to the ith subscriber, and $w_m(i)$ is the beamforming coefficient which determines the relative phase and gain of the ith signal at the mth antenna.

Each combined chip sequence is then applied to multichannel transmitters 32 comprising a set of pulse shaping and RF conversion modules 48(1)–48(M). Each of the pulse shaping and RF conversion modules 48(1)–48(M) are driven by a common local oscillator 34. The resulting RF signals are then transmitted by an array of antennas 33. The antenna array 33 comprises a plurality M of antennas.

It is clear from the above description that the modulation process is a complicated procedure. Modulation in a spread spectrum antenna array system requires at least 2×M×L×L operations without the use of a fast algorithm. An alternative, as disclosed in U.S. Pat. No. 5,300,474, entitled "System and Method for Generating Signal Waveforms in a CDMA Cellular Telephone System," is to realize combining using analog combiners. This method slightly lowers the computational cost at the expense of hardware. The overall number of computations required is still on the order of M×L×L. The load will increase drastically and may become prohibitive if the spreading factor L is large.

Another option for realizing spreading and beamforming, as well as combining, is to use look-up tables. However this leads to exceedingly large storage requirements when all possible combinations must be considered, and a correspondingly large computation time in the setting up of the tables. In addition, in a system which includes transmission beamforming, the resultant beamformed values are arbitrary, and thus a look-up table cannot be used. Therefore, simpler modulation schemes with lower complexity and storage requirements on the order of a magnitude or more are highly desirable.

Figure 2:
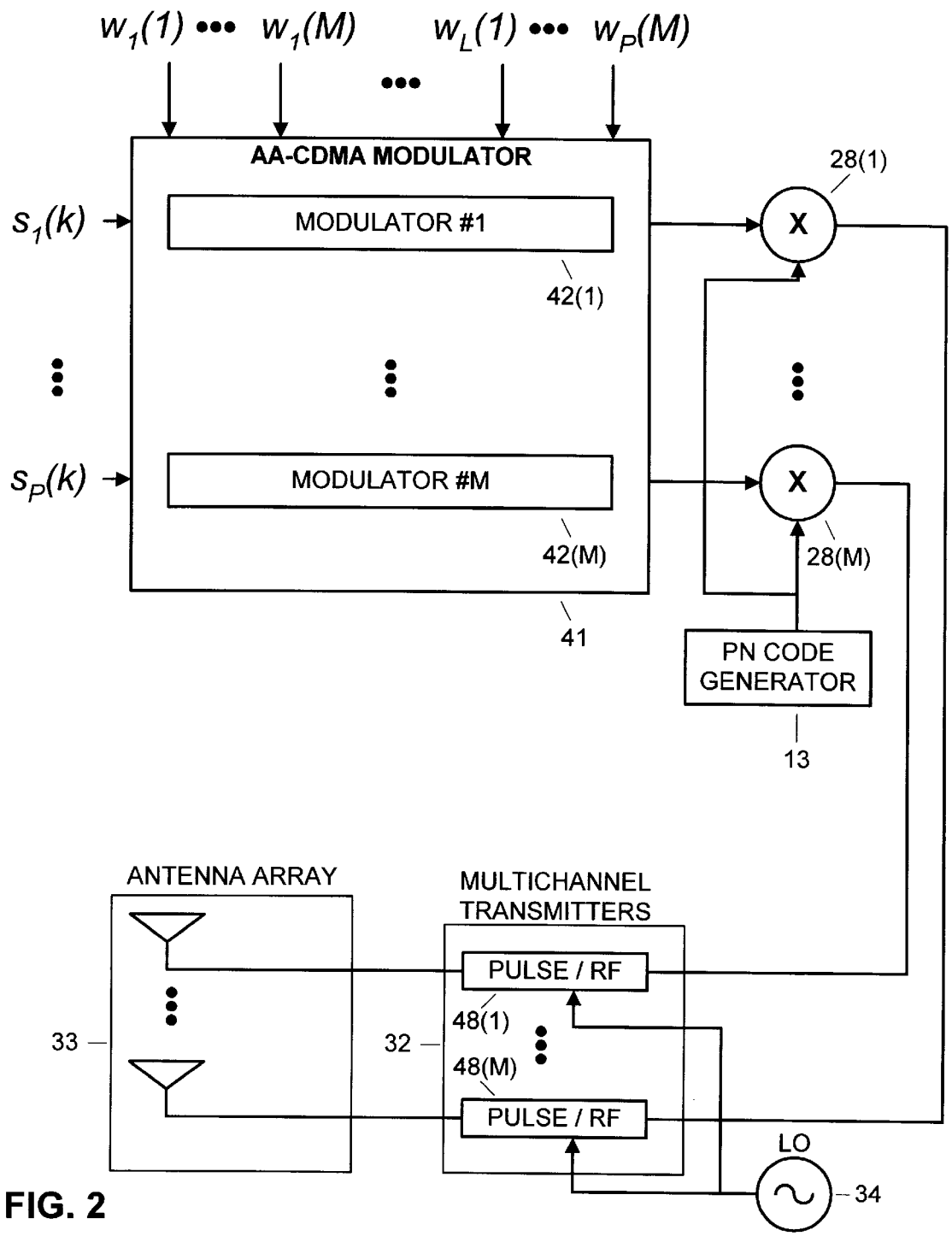
FIG. 2. illustrates simultaneous modulation of S-CDMA signals for all symbols and all antennas according to the preferred embodiment of the present invention.

FIG. 2—Antenna Array CDMA Modulator of the Present Invention

FIG. 2 is a generic representation of a system 50 including an antenna array (AA) CDMA modulator 41 in accordance with the preferred embodiment of the present invention. As noted above, the present invention is preferably used in an antenna array CDMA system. However, it is noted that the present invention may be used in any of various types of S-CDMA systems.

In the embodiment shown, as in the prior art example of FIG. 1, the number of Walsh codes or spreading factor is presumed to be L, which equals the maximum number of terminals allowed. Also, there are a total of M antennas in the system. The symbol sequence to be spread with the ith Walsh code is denoted as $s_i(k)$. Further, there are presumed to be P active users in the system where $L \geq P$.

The CDMA modulator 41 comprises one or more modulators 42. In a single antenna system, the modulator 41 comprises a single modulator 42. In the preferred embodiment comprising an antenna array system, the modulator 41 comprises a plurality M modulators 42(1)–42(M). The description that follows presumes an antenna array CDMA system. In this embodiment, the modulator 41 includes a plurality M modulators for each of the M antennas. The modulator 41 includes P inputs and M outputs, wherein each of the M outputs comprises an L chip sequence.

In the preferred embodiment, the modulator 41 comprises one or more digital signal processors (DSPs) and one or more memories. The one or more DSPs and one or more memories implement each of the modulators 42(1)–42(M). In other words, the one or more memories store code and data for implementing the modulator functions according to the present invention, and the one or more DSPS are operable to execute the code and data to perform the modulator functions according to the present invention. Thus, in this embodiment, the modulators 42(1)–42(M) in FIG. 2 are representations of the modulator functions performed by the one or more DSPS and the one or more memories. It is noted that the modulator 41 may be implemented in any of various ways, including general purpose or special purpose programmable DSPs, programmable CPUs, other types of programmable logic, discrete logic, or combinations thereof.

Each of the modulators 42(1)–42(M) receives respective input signals $s_1(k), s_2(k), \ldots, s_P(k)$ as shown. Each of the modulators 42(1)–42(M) also receives predetermined beamforming vectors, $w_1(1) \ldots w_1(M) \ldots w_P(1) \ldots w_P(M)$. The modulator 41 produces M outputs for each of the M antennas, where each of the outputs comprises L-chip signals, i.e., signals comprising L chips. Each of the modulators 42(1)–42(M) outputs its L-chip signal sequentially.

Contrasting to the prior art, each modulator accomplishes chip level modulation functions of spreading and combining in one step, rather than two steps as described earlier. Each antenna array CDMA modulator receives the P message symbols, $s_1(k), s_2(k), \ldots, s_P(k)$, and the predetermined beamforming vectors, $w_1(1) \ldots w_1(M) \ldots w_P(1) \ldots w_P(M)$, and performs the beamforming operations. As described further below, each modulator 42 includes a Fast Hadamard Transform (FHT) processor which performs the Fast Hadamard Transform on the input signals. The FHT processor operates to perform the spreading and combining operations, which are performed substantially simultaneously. In other words, the FHT processor performs the spreading and combining operations in a single step. The FHT processor allows for fast modulation according to the present invention. It is noted that the modulator 41 does not perform the operation of masking the signals with the PN sequence.

The modulator 41 provides each of the respective M outputs to respective multipliers 28(1)–28(M). A PN code generator 13 is coupled to each of the multipliers 28. As noted above, each of the M outputs is an L-chip signal which is output sequentially. Each of the multipliers 28(1)–28(M) perform the operation of masking the L-chip signal with the PN sequence after operation of the modulator 41. The final chip sequences output from the multipliers 28(1)–28(M) are then pulse-shaped and upconverted using multichannel transmitters 32. The multichannel transmitters 32 comprise pulse/RF transmitters 48(1)–48(M). The pulse/RF transmitters 48 are driven by a common local oscillator 34. The outputs of the transmitters 48 are fed to an array of M antennas 33 as done in prior art.

The system and method of the present invention is capable of accomplishing the modulation functions in one step with low complexity, which is unique to the invention. To describe the detailed modulation procedure, background on Walsh orthogonal codes and the Fast Hadamard Transform is deemed appropriate.

It is well known in the art that the Walsh code words are a set of orthogonal binary sequences of length L, where L is any power-of-2 integer. For more information, please see Digital Communications with Space Applications, S. W. Golomb et al., Prentice-Hall, Inc, 1964, pp. 45–64, which was referenced above. The elements of a Walsh code take only binary values, and can be efficiently generated by matrices referred to as Hadamard Transform matrices. In particular, by defining the core matrix $$H_i = \begin{bmatrix} 1 & 1 \\ 1 & -1 \end{bmatrix}$$

and recursion $$H_l = \begin{bmatrix} H_{l-1} & H_{l-1} \\ H_{l-1} & H_{l-1} \end{bmatrix}$$

Walsh codes of length L can be easily generated as the row vectors of $H_L$. The row or column number of the above Walsh matrix is referred to as the Walsh index.

The Hadamard (Walsh) matrices are real, symmetric, and orthogonal. As a result, a Fast Hadamard Transform (FHT) exists for simultaneous despreading of L CDMA signals with LlogL computations; see Fundamentals of Digital Image Processing, Anil K. Jain, Prentice-Hall, Inc, 1989, pp. 157–158, which was referenced above. However, the prior art does not address fast implementation of modulation, especially fast modulation of beamformed symbols with arbitrary values.

According to the present invention, it was discovered that, when the Fast Hadamard Transform is applied to the P beamformed symbols, $w_m(1)s_1(k) \ldots w_m(P)s_P(k)$, the outputs of the Fast Hadamard Transform are exactly the L modulated chips, $x_k^m(l)$ l=1, ..., L. In other words, since the Hadamard or Walsh matrix is symmetric, it was discovered according to the present invention that the Hadamard matrix could be used for both spreading and despreading. This fact enables utilization of straightforward operations to complete the rather complicated spreading and combining operations by taking advantage of the special structure of Walsh codes.

Of course, in many situations, the number signals to be spread and combined may be less than L. In these cases, in the preferred embodiment zeros are added to make the total number of inputs equal to L. More specifically, each of the P signals (beamformed symbols in the context of antenna array systems) are applied to a respective input of the FHT processor, wherein, for each respective signal of the P signals, the respective input of the FHT processor corresponds to the orthogonal Walsh code used to spread the respective signal; any remaining L–P inputs of the FHT processor are fed with zeros.

Figure 3:
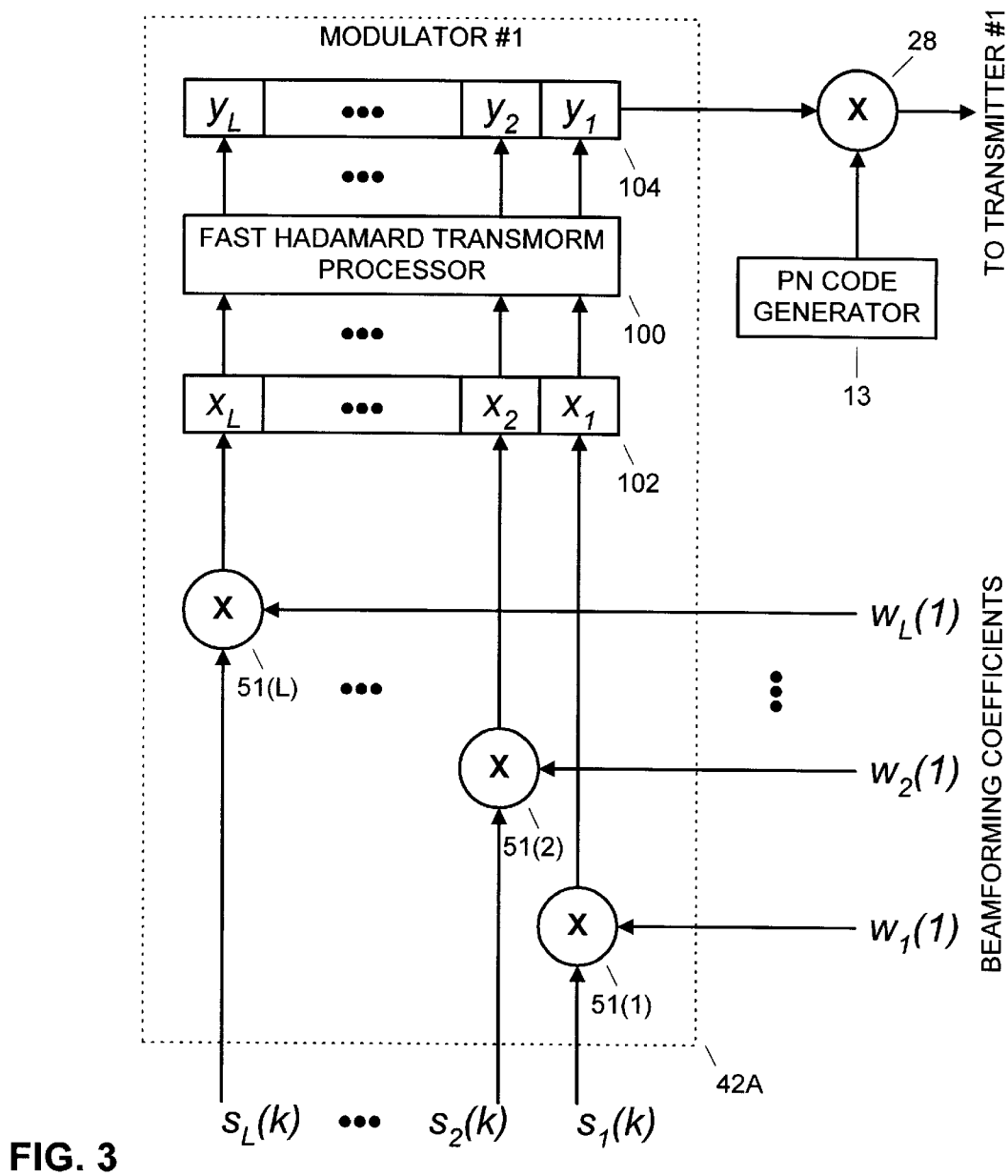
FIG. 3. is a block diagram of an embodiment of a S-CDMA modulator for the first antenna according to the present invention.

FIG. 3—Modulator Embodiment

FIG. 3 illustrates an exemplary embodiment of modulator #1 (42(1)) in accordance with the present invention. FIG. 3 illustrates a modulator 42 for a first antenna in an antenna array system; all other modulators (42(2) to 42(M)) bear the same structure. It is noted that each modulator 42 receives P inputs and produces a single L-chip sequence.

It is noted that, in the preferred embodiment, the modulator is incorporated in an antenna array system. However, the modulator of the present invention may be used in single antenna systems, as desired. In a single antenna embodiment, the modulator 41 produces a single combined L-chip output for the single antenna, and no beamforming is required.

Inputs to the modulator are the L symbols, $s_1(k)$, $s_2(k), \ldots, S_L(k)$, and their corresponding beamforming coefficients, $w_1(1), \ldots, w_L(1)$. It is noted that if there are only P terminals, where L>=P, then only P symbols may be input to the modulator 41. In this case, the remaining unused inputs receive 0 value symbols. In other words, for illustration simplicity, it is assumed that the number of symbols to be modulated equals the spreading factor. It is noted that this is not a restriction of the present invention. When the number of symbols is less than the spreading factor, zero value symbols and beamforming coefficients can be used without affecting the modulation operations.

A plurality L multipliers 51(1)–51(L) each having first and second inputs and an output are employed to produce L beamformed symbols, $x_1, x_2, \ldots, X_L$. The first input of each of the L multipliers is coupled to receive a respective symbol, $s_i(k)$, i=1, ..., L, wherein the second input of each of the L multipliers is coupled to receive a respective beamforming coefficient, $w_1(1), w_2(1), \ldots, W_L(1)$. For the modulator #1 42(1), each multiplier 51 receives a respective beamforming coefficient $w_x(1)$. Each of the plurality L multipliers 51 is operable to multiply the respective L symbol with the respective beamforming coefficient to produce the L beamformed signals at the output. The outputs of each of the plurality L multipliers 51 are coupled to an input buffer 102 for storing L inputs signals $(x_1, x_2, \ldots, X_L)$. The input buffer 102 is coupled to provide outputs to an FHT processor 100 according to the present invention.

As described above, according to the present invention the FHT processor 100 performs a Fast Hadamard transform on the L input signals from the input buffer 100 to produce L output chip signals within the kth symbol period, $y_1, y_2, y_L$. The Fast Hadamard Transform Processor 100 performs spreading and combining in a single operation with reduced computational requirements.

An output buffer 104 is coupled to the FHT processor 100 for storing the L output chip signals of the Fast Hadamard Transform (FHT) Processor 100. The output buffer 104 is operable to output the L output chip signals in a pre-determined order. In one embodiment, the output buffer 104 is not included, and a respective delay element is coupled to each of the outputs of the FHT processor 100. Each of the delay elements are configured to provide the outputs according to a desired pre-determined order, i.e., according to the order of the L-chip sequence.

If masking is required, multiplier 28 is coupled to the output buffer 104 to mask the output chip signals with a PN sequence provided by a PN code generator 13. The output sequence of the multiplier 28 is then pulse shaped, upconverted, and transmitted from the first antenna as done in the current art.

Although described in the context of antenna array systems, the disclosed invention comprises a fast S-CDMA modulator for performing spreading and combining symbols with arbitrary values. Thus, beamforming is not required. Where beamforming is omitted, the plurality L multipliers 51 can be omitted, and instead the L symbols are applied directly to the input buffer 102.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not to be limited to the embodiments shown herein but is to be accorded the widest scope consistent with the principles and novel features disclosed herein.

I claim:

1. A synchronous code-division multiple access (S-CDMA) modulator for modulating P signals with a plurality L of Walsh orthogonal codes of order L to generate L output chip signals within a symbol period in synchronous CDMA communications, the modulator comprising:

a Fast Hadamard Transform (FHT) Processor including a plurality L inputs for receiving L input signals, wherein the L input signals include the P signals, wherein the FHT processor includes one or more outputs for generating L output chip signals, wherein the FHT processor performs a Fast Hadamard Transform on the L input signals to produce the L output chip signals, wherein the FHT processor is operable to perform spreading and combining on said L input signals to produce said L output chip signals;

an input buffer coupled to said plurality L inputs of said FHT processor, wherein said input buffer comprises L elements for storing said P signals, wherein said input buffer is operable to apply said P signals to the plurality L inputs of said Fast Hadamard Transform Processor;

wherein L is a power-of-2 integer and P is a positive integer less than or equal to L;

wherein said one or more output chip signals are transmittable in a predetermined order to accomplish S-CDMA communications.

2. The S-CDMA modulator as defined by claim 1, wherein said input buffer comprises L elements for storing said P signals and also for storing L−P zeros;

wherein said input buffer is operable to apply said P signals and said L−P zeros to the plurality L inputs of said Fast Hadamard Transform Processor wherein the L input signals to the FHT Processor include the P signals and said L−P zeros.

3. The S-CDMA modulator as defined by claim 2, wherein said input buffer stores said L inputs for application to said Fast Hadamard Transform Processor;

wherein each of said L inputs of said FHT processor corresponds to one of said plurality L Walsh orthogonal codes;

wherein said input buffer is operable to store each of said P signals at a position corresponding to a respective input of said FHT processor, wherein, for each respective signal of said P signals, the respective input of said FHT processor corresponds to the orthogonal Walsh code used to spread the respective signal;

wherein said input buffer is operable to store zeros in any remaining wherein said input buffer is operable to store zeros in any remaining L−P elements of said input buffer.

4. The S-CDMA modulator as defined by claim 1, further comprising:

an output buffer coupled to said one or more outputs of said FHT processor for storing said L output chip signals of said Fast Hadamard Transform Processor, wherein said output buffer is operable to output said L output chip signals in a pre-determined order.

5. The S-CDMA modulator as defined by claim 1, wherein said modulator is operable for use in an antenna array system, wherein the antenna array comprises M antennas;

the modulator further comprising:

a plurality P multipliers each having first and second inputs and an output, wherein said first input of each of said P multipliers is coupled to receive a respective symbol, wherein said second input of each of said P multipliers is coupled to receive a respective beamforming coefficient, wherein each of said plurality P multipliers is operable to multiply said respective P symbol with said respective beamforming coefficient to produce said P signals at said output, wherein said outputs of each of said plurality P multipliers are coupled to said FHT processor to provide said P signals to said FHT processor;

wherein the S-CDMA modulator is operable to perform spreading, beamforming and combining on said L input signals to produce said L output chip signals.

6. A method for performing synchronous code-division multiple access (S-CDMA) modulation for modulating P signals with a plurality L of Walsh orthogonal codes of order L to generate L output chip signals within a symbol period in synchronous CDMA communications, the method comprising:

receiving L input signals, wherein the L input signals include the P signals;

performing a Fast Hadamard Transform on the L input signals to produce the L output chip signals, wherein said performing the Fast Hadamard Transform performs spreading and combining on said L input signals to produce said L output chip signals;

generating said L output chip signals;

wherein L is a power-of-2 integer and P is a positive integer less than or equal to L.

7. The method of claim 6, further comprising:

transmitting said L output chip signals in a pre-determined order to accomplish S-CDMA communications.

8. The method of claim 6, wherein the L input signals include the P signals and L−P zeros.

9. The method of claim 8, further comprising:

storing said P signals and said L−P zeros in an input buffer, wherein said input buffer comprises L elements; and applying said P signals and said L−P zeros from said input buffer to a plurality L inputs of a Fast Hadamard Transform (FHT)processor;

wherein said receiving L input signals is performed in response to said applying;

wherein said performing a Fast Hadamard Transform comprises the FHT processor performing a Fast Hadamard Transform on the L input signals to produce the L output chip signals.

10. The method of claim 9, further comprising:

wherein each of said L inputs of said FHT processor corresponds to one of said plurality L Walsh orthogonal codes;

wherein said storing said P signals and said L−P zeros in an input buffer comprises storing each of said P signals at a position corresponding to a respective input of said FHT processor, wherein, for each respective signal of said P signals, the respective input of said FHT processor corresponds to the orthogonal Walsh code used to spread the respective signal;

wherein said storing includes storing zeros in any remaining L−P elements of said input buffer.

11. The method of claim 6, storing said L output chip signals of said Fast Hadamard Transform Processor; and outputting said L output chip signals in a pre-determined order.

12. The method of claim 6, further comprising:

multiplying a respective P symbol with a respective beamforming coefficient to produce said P signals, wherein said multiplying is performed prior to said receiving said L input signals;

wherein the S-CDMA modulation method is operable to perform spreading, beamforming and combining on said L input signals to produce said L output chip signals.

* * * * *